N. J. BECKNER.
COLLAPSIBLE STEP.
APPLICATION FILED NOV. 8, 1917.
1,266,762.
Patented May 21, 1918.
2 SHEETS—SHEET 1.
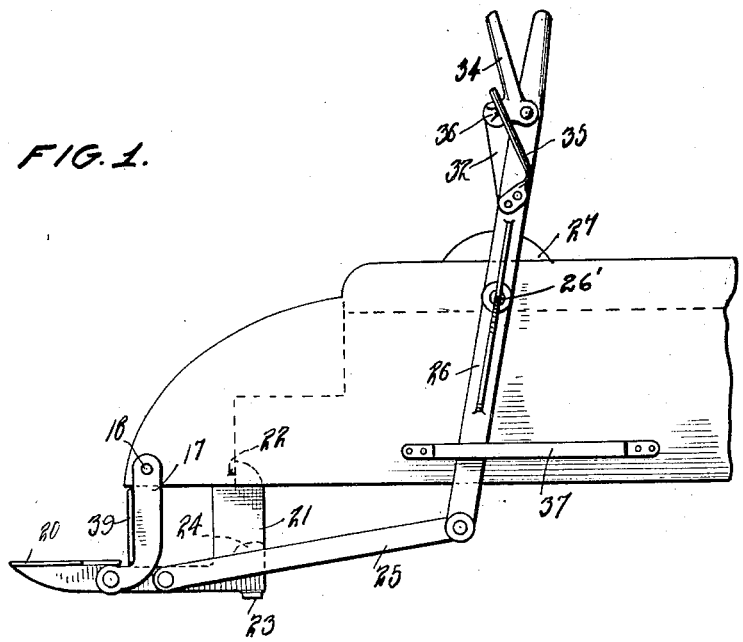
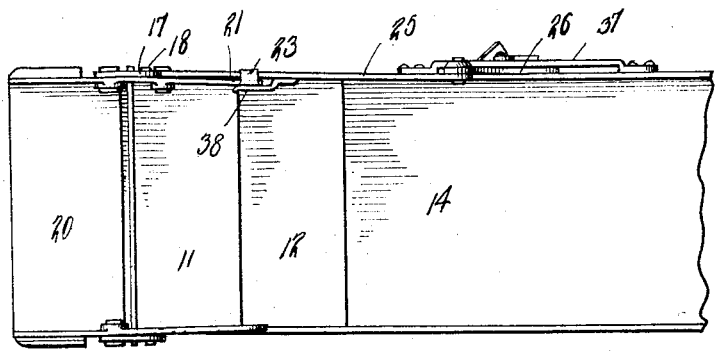
WITNESSES
W. C. Fielding.
Wm Jeaman
INVENTOR
Noah J. Beckner
BY Richard Owen.
ATTORNEY

N. J. BECKNER.
COLLAPSIBLE STEP.
APPLICATION FILED NOV. 8, 1917.

1,266,762.

Patented May 21, 1918.
2 SHEETS—SHEET 2.

WITNESSES
W. C. Fielding.
Wm Zeaman

INVENTOR
Noah J. Beckner
BY Richard Owen
ATTORNEY

UNITED STATES PATENT OFFICE.

NOAH J. BECKNER, OF NORTH YAKIMA, WASHINGTON, ASSIGNOR TO SAFETY PATENT CO., OF YAKIMA, WASHINGTON, A CORPORATION OF WASHINGTON.

COLLAPSIBLE STEP.

1,266,762. Specification of Letters Patent. Patented May 21, 1918.

Application filed November 8, 1917. Serial No. 200,964.

*To all whom it may concern:*

Be it known that I, NOAH J. BECKNER, a citizen of the United States, residing at North Yakima, in the county of Yakima and State of Washington, have invented certain new and useful Improvements in Collapsible Steps, of which the following is a specification.

This invention has relation to collapsible car steps, and has for an object to provide a car step for railroads, street railways, or other public or private conveyances of a nature to be extended for use in effecting ingress or egress of the vehicle, and to be collapsed to a position beneath the vehicle out of the way.

Another object of the invention is to provide an extensible and collapsible step for vehicles operable by means of a lever, and constructed in a manner to hold the step rigid in either an extended or collapsed position.

Another object of the invention is to provide an extensible step mounted on links and adapted for movement to a position out of the way beneath the steps usually provided to form an additional step, with an extension of the extensible step adapted to engage beneath one of the steps of the regular equipment to retain the extensible step in a rigid extended position, and to enable the same to support the weight of a person.

In addition to the foregoing my invention comprehends improvements in the details of construction and arrangement of the parts to be hereinafter more fully described and particularly set forth in the appended claims.

In the accompanying drawings in which similar and corresponding parts are designated by the same characters of reference throughout the several views in which they appear:—

Figure 1, is a view in side elevation of my extensible step illustrating the same in an extended position.

Fig. 2, is a view of the step in plan.

Figure 3:
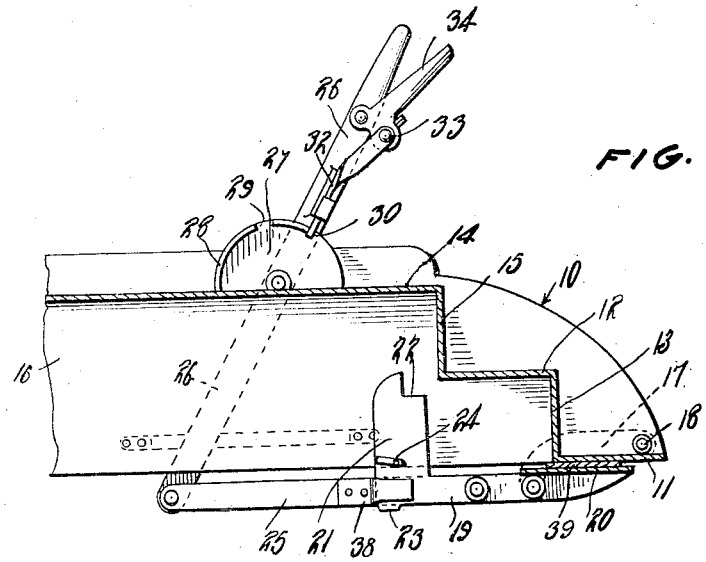
Fig. 3, is a view taken through my extensible step in section illustrating the same in a collapsed position.
Figure 4:
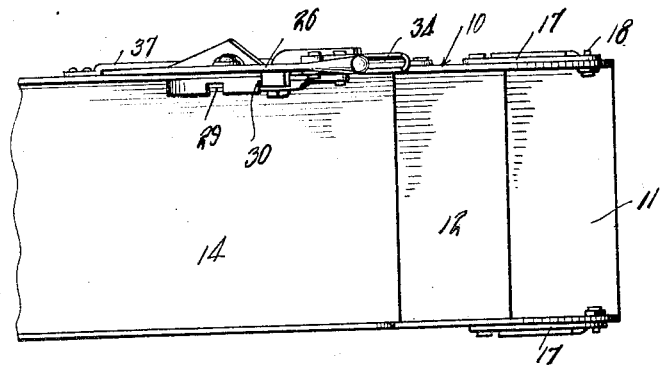
Fig. 4, is a view in bottom plan of the collapsible step in the same position as that indicated in the preceding figure.

With reference to the drawings 10 indicates generally the ordinary steps for a railroad car, electric street car, or the like, consisting of a lower tread 11 and an intermediate tread 12 connected by a riser 13. A landing 14 is provided connected to the tread 12 by means of a riser 15. The steps are mounted upon side plates 16.

A pair of links 17 are provided, one depending from each end of the lower tread 11 of the step equipment, adjacent the forward edge thereof upon bolts 18 each link pivotally supporting at its lower end a horizontal bar 19. The forward ends of the bars 19 are connected together by means of a tread 20 to form a step, and the rear end of each bar 19 is formed with a vertical extension 21 having a notch 22 formed upon its upper end adjacent its forward edge as indicated in Fig. 3. The rear end of one bar 19 is formed adjacent its lower edge with a laterally extending lug 23, and a lug 24 is formed upon the inside surface of the extension 21 of said bar 19 which carries the lug 23. Pivoted to said bar 19 at a point intermediate its end is a link 25, the opposite end of the link being pivotally connected to an upwardly extending lever 26 which is fulcrumed at 26' upon a segment 27 mounted upon the landing 14. Said segment 27 is formed with a semicircular laterally extending flange 28 having a notch 29 formed therein and a notch 30.

The lever 26 is provided with a locking mechanism which consists of a guide 31 mounted thereon in which to receive a bolt 32 mounted to slide longitudinally of the lever and to engage at its lower end in the notches 29 and 30 of the segment 27. The opposite end of the bolt 32 is connected as at 33 to a hand grip 34 pivoted to the upper end of the lever. A leaf spring 35 is also secured to the lever to bear against a lug 36 formed on the hand grip 34 in a manner to urge the bolt 32 into engagement with the notches of the segment. To guide the lever 26 during movement thereof I provide a guide indicated at 37 upon one side of the step equipment.

As shown in Fig. 3, the lever may be actuated so as to move the step 20 to a collapsed position, that is with the step tread 20 disposed in close proximity to and beneath the lower tread 11 of the step equipment, the lug 23 by engagement beneath the lower edge of the link 25, serves to form a support for the tread 20 to keep the same from moving downward inasmuch as the weight of said tread would be sufficient to overbalance the weight of the opposite ends of the bars 19 which would cause the rear ends of the bars 19 to rise were it not for the provision of the lug 23. In this position of the step the locking bar 32 of the lever is positioned in the notch 30 to retain the step in a collapsed position. A clip 38 may be secured to the inner surface of the bar 25 to engage over the rear end of the extension 19 bearing said lug 23 as indicated in Fig. 3 to prevent lateral separation of the link 25 and bar 19 to insure positioning of the lug 23 beneath said link.

To extend the step, the link 25 is oscillated to move its upper end rearward subsequent to disengaging the locking bar 32 from the notch 30, and the step 20 is moved downward, moving the link 19 from a horizontal position to a depending position as shown in Fig. 1.

This movement of the tread 20 will be limited to some extent by the engagement of the lug 24 with the clip 38 as shown in Fig. 1. Furthermore, the juncture of the tread 12 with the lower edge of the riser 15 of the step equipment is seated in the notches 22 of the upwardly extending extension 21 as shown in Fig. 1 to further limit the forward movement of the extensible step. It will also be apparent that the positioning of the extension 21 beneath the tread 12 offers a resistance to downward movement of the tread 20 and affords a support for the weight applied to said step. The step is thus held in a rigid position both in the extended position thereof or the collapsed position. The step may be locked in the extended position by permitting the locking bar 32 of the lever to engage in the notch 29 of the segment. A riser for the extensible step 20 may be provided by connecting the links 17 by means of a plate 39.

While I have illustrated and described my invention with some degree of particularity I realize that in practice various alterations thereover may be made, and I therefore desire to reserve the right and privilege of changing the form of the details of construction or otherwise altering the arrangement of the parts without departing from the spirit of the invention or the scope of the appended claims.

Having thus described my invention what I claim as new and desire to secure by Letters Patent is:—

1. In combination with fixed steps, a movable tread, means for supporting the same for movement from a position in front of the fixed steps to a position therebeneath, and means extending rearwardly from the movable step adapted, when said step is in lowered position to engage the under side of one of the fixed steps to prevent downward movement of the movable step under weight imposed thereupon.

2. In combination with fixed steps, a movable step, means for supporting the same for oscillation from a position in front of the fixed steps to a position therebeneath, means for moving the movable step, means for locking said moving means in any one of its positions, and means forming an extension of the rear of the movable step adapted, when the movable step is lowered to engage the underside of one of the fixed steps to prevent downward movement of the movable step when weight is imposed thereupon.

3. In combination with fixed steps, a movable step, means for mounting the same for oscillation from a position forwardly of the step to a raised position beneath the step, notched rear extensions of the movable steps adapted, when the tread is lowered to engage the juncture of one of the risers and tread of the stationary step to prevent downward movement of the movable tread when weight is imposed thereupon.

4. In combination with stationary steps, a movable tread, means for supporting the said tread for oscillation from a lowered position in front of the fixed steps to an elevated position beneath the fixed steps, a pair of normally horizontal bars supporting the movable tread, an upright extension on the rear end of each bar having a notch at the upper end of each upright, to receive, when the tread is in lowered position one corner of one of the stationary steps, to prevent downward movement of the movable tread when weight is imposed thereupon, and means for moving the movable tread.

5. In combination with fixed steps, a movable tread, links depending from the fixed steps to support the tread for movement from a position in front of the fixed steps to a position therebeneath, a rear extension of said tread, a pair of lugs formed on said extension, a link connected at one end to said extension, a lever pivotally mounted on the fixed steps and having one end connected to the other end of said link, and a clip mounted on said link engageable by one of the lugs to prevent the tread from tipping up from a horizontal position, the other link engaging the lug to prevent the tread from falling from a horizontal position.

In testimony whereof I affix my signature in presence of two witnesses.

NOAH J. BECKNER.

Witnesses:
FRANK J. REAMES,
THOMAS H. WILSON.